US011346536B2

(12) United States Patent
Gielen

(10) Patent No.: US 11,346,536 B2
(45) Date of Patent: May 31, 2022

(54) KIT OF PARTS COMPRISING A CABLE GLAND, A WIRE TRANSPORT ELEMENT AND A HOUSING, SYSTEM MADE OF SUCH A KIT, AND METHOD FOR FUNCTIONALLY CONNECTING THE SYSTEM

(71) Applicant: SIGNIFY HOLDING B.V., Eindhoven (NL)

(72) Inventor: Vincent Stefan David Gielen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/255,236

(22) PCT Filed: Jun. 25, 2019

(86) PCT No.: PCT/EP2019/066735
§ 371 (c)(1),
(2) Date: Dec. 22, 2020

(87) PCT Pub. No.: WO2020/002272
PCT Pub. Date: Jan. 2, 2020

(65) Prior Publication Data
US 2021/0116114 A1 Apr. 22, 2021

(30) Foreign Application Priority Data
Jun. 28, 2018 (EP) ..................................... 18180313

(51) Int. Cl.
*F21V 23/00* (2015.01)
*F21V 23/06* (2006.01)
(Continued)

(52) U.S. Cl.
CPC ............ *F21V 23/001* (2013.01); *F21V 23/06* (2013.01); *H02G 3/0675* (2013.01); *H02G 3/083* (2013.01)

(58) Field of Classification Search
CPC ..... F21V 23/001; F21V 23/06; H02G 3/0675; H02G 3/083
See application file for complete search history.

(56) References Cited

U.S. PATENT DOCUMENTS

| 4,599,487 A * | 7/1986 | Blank ................. H02G 15/013 |
| | | 174/151 |
| 2013/0009546 A1* | 1/2013 | Hollander .............. H05B 45/20 |
| | | 315/113 |

(Continued)

FOREIGN PATENT DOCUMENTS

| BR | 202012008888 U2 | 5/2014 |
| CN | 205480408 U | 8/2016 |

(Continued)

OTHER PUBLICATIONS

"Cambium PTP 650 LPU and Grounding Kit Installation Guide", Jul. 1, 2013.

*Primary Examiner* — Timothy J Thompson
*Assistant Examiner* — Rhadames Alonzo Miller
(74) *Attorney, Agent, or Firm* — Daniel J. Piotrowski

(57) ABSTRACT

The invention provides a kit of parts, especially for a lighting system with a light generated device hosted in a housing, the kit of parts comprising (i) a cable gland (100) comprising a cable gland body (110) and a sealing nut (120) for the cable gland body (110), wherein the cable gland (100) is configured for hosting an electrical cable (10) over at least part of a cable length (L) of the electrical cable (10), wherein the electrical cable (10) comprises an electrically conductive wire (11), wherein the cable gland (100) has a cable gland length (L2), and (ii) a wire transport element
(Continued)

(2000) comprising a wire transport connector facility (2220) for hosting a part of a functional device electrically conductive wire (311), wherein the shape of the wire transport element (2000) is such that the wire transport element (2000) can be transported through the cable gland (100) over at least part of the cable gland length (L2).

12 Claims, 7 Drawing Sheets

(51) Int. Cl.
*H02G 3/06* (2006.01)
*H02G 3/08* (2006.01)

(56) References Cited

U.S. PATENT DOCUMENTS

| | | | |
|---|---|---|---|
| 2013/0088869 A1* | 4/2013 | Yun | F21V 3/00 362/249.01 |
| 2014/0036504 A1* | 2/2014 | Kim | F21V 31/005 362/249.02 |
| 2014/0185289 A1* | 7/2014 | Clauss | F21V 29/763 362/240 |
| 2015/0131287 A1* | 5/2015 | Marsh | F21V 15/01 362/260 |
| 2015/0295365 A1* | 10/2015 | Post | H01R 13/6592 439/607.03 |
| 2015/0345773 A1* | 12/2015 | Kang | F21V 17/12 362/267 |
| 2016/0356475 A1* | 12/2016 | Honda | F21V 5/04 |
| 2018/0031773 A1* | 2/2018 | Ohtsuka | G02B 6/3891 |

FOREIGN PATENT DOCUMENTS

| | | |
|---|---|---|
| CN | 106152081 A | 11/2016 |
| DE | 20204382 U1 | 9/2003 |
| DE | 202016004266 U1 | 9/2016 |
| EP | 3179164 A1 | 6/2017 |
| KR | 2007026227 A | 3/2007 |

* cited by examiner

KIT OF PARTS COMPRISING A CABLE GLAND, A WIRE TRANSPORT ELEMENT AND A HOUSING, SYSTEM MADE OF SUCH A KIT, AND METHOD FOR FUNCTIONALLY CONNECTING THE SYSTEM

CROSS-REFERENCE TO PRIOR APPLICATIONS

This application is the U.S. National Phase application under 35 U.S.C. § 371 of International Application No. PCT/EP2019/066735, filed on Jun. 25, 2019, which claims the benefit of European Patent Application No. 18180313.1, filed on Jun. 28, 2018. These applications are hereby incorporated by reference herein.

FIELD OF THE INVENTION

The invention relates to a kit of parts including a cable gland. The invention also relates to a support plug. The invention further relates to a system including such cable gland. The invention also relates to a method of functionally connecting such system with an electrical cable.

BACKGROUND OF THE INVENTION

The use of cable glands is known in the art. U.S. Pat. No. 7,115,822, for instance, describes a cable gland assembly adapted to receive a cable and to pass through an opening in a sparking enclosure wall, the cable gland assembly including a cable-receiving gland adapted to receive said cable, a stuffing box, a grommet, and an insulator, said stuffing box having an opening there through, said stuffing box having an end releasably connected to said cable-receiving gland, a grommet-receiving portion having said grommet therein and being adjacent said cable-receiving gland, a gas terminal portion filled with gas and adjacent said grommet-receiving portion, and an insulator portion having said insulator therein and being adjacent said gas terminal portion.

US 2015/0345773 discloses an optical semiconductor illuminating apparatus which includes a light emitting module including semiconductor optical elements, a casing part disposed over the light emitting module and having a switching mode power supply (SMPS) embedded therein, a first airtightness part including a packing frame fixed to an outer side of an edge of a communication slot penetrating through a side surface of the casing part, and a second airtightness part provided to an upper side of the casing part.

Cambium PTP 650 LPU and Grounding Kit Installation Guide (1 Jul. 2013, XP055533785) discloses how to install the PTP 650 LPU and Grounding Kit (Cambium part number C000065L007). The kit contains two lightning projection units (LPUs) and LPU ground cables. One kit is used for each of the PSU and AUX copper Cat5e Ethernet interfaces to the ODU.

DE 20 2016 004 266 U1 discloses a closure assembly for sealingly closing a lamp housing with a closure element, a fastening element and a seal, wherein the seal for sealing a docking area between the closure element and light housing is formed, wherein the closure assembly is designed such that the closure element for closing in a first direction relative to the lamp housing is movable, and the closure element by a relative movement of the fastening element in a second direction that is substantially transverse to the first direction, can be secured.

DE 202 04 382 U1 discloses a housing which has a cable insertion opening and an internal connection element for at least one cable. A bearer element can be pulled out via the opening, is connected to the connection element and has an attachment section at one end with a cable opening and an attachment region for the connection element at the other end. The bearer and connection element can be pulled out to connect the cable then pushed back into the housing.

EP 3 179 164 A1 discloses a hermetic light tube comprising a light-transmitting tubular body having a volume cavity and integrally formed; a light-emitting body; connection terminals; two end caps configured to be respectively adapted for mounting at the two ends of the tubular body, each of the end caps having a proximal end and a distal end wherein the proximal end is coupled to a corresponding one of open ends of the tubular body; a first seal arranged between the proximal end of each of the end caps and a corresponding one of the ends of the tubular body, the first seal being provided such that the end cap and the end of the tubular body with which the end cap is connected form a seal-tight connection; two decorative caps sleeved respectively on two end caps; a second seal arranged between the distal end of each of the end caps and an outer end of a respective one of the decorative caps in a manner that the second seal is compressed by the outer end of the decorative cap to abut against the distal end of the end cap so that the end cap and the decorative cap with which the end cap is connected form a compression seal; and two gland covers hermetically encapsulating the outer end of a respective one of the decorative caps.

SUMMARY OF THE INVENTION

Cable glands in the art may consist of a complicated assembly and/or may complicate the functional coupling of a device with an electrical cable. Further, cable glands which are not in use may provide an opening to the device, or the housing thereof, to which the cable gland is functionally coupled. Through such opening, material, such as dust and/or humid air, or even water, may enter the device. This may be undesirable.

Hence, it is an aspect of the invention to provide an alternative cable gland or alternative use of a cable gland, which preferably further at least partly obviates one or more of above-described drawbacks. The present invention may have as object to overcome or ameliorate at least one of the disadvantages of the prior art, or to provide a useful alternative.

Herein, amongst others a plug is proposed which can be received by the cable gland, and which can sealingly close or form a sealingly closure with the cable gland as a kind of dummy wire. Such gland may protect the device or housing thereof from intrusion of undesirable material. Further, the plug may be used for facilitating the functional connection with an external electrical cable by connecting the plug with the electrical wiring of the device. When removing the plug, the wiring is partly pulled through the cable gland (out of the housing) and can be connected with the external cable. Then, the wiring and at least part of the electrical cable, now functionally coupled with the electrical wiring of the device can be pushed (back) into the housing via the cable gland, and the cable gland can then be closed, by sealingly closing around the electrical cable with a sealing nut.

Hence, in a first aspect the invention provides a kit of parts ("kit") comprising: (i) a cable gland ("gland") comprising a cable gland body ("body" or "gland body") and a sealing nut ("nut") (for the cable gland body), wherein the cable gland is especially configured for hosting an electrical cable ("cable" or "external cable")) over at least part of a cable length (L) of the electrical cable, wherein the electrical cable comprises an electrically conductive wire ("wire" or "electrical wire" or "second electrical wire" or "external electrical wire"), wherein the cable gland has a cable gland length (L2); and (ii) a wire transport element ("transport element") comprising a wire transport connector facility for hosting a part of a functional device electrically conductive wire ("first electrical wire" or "device wire" or "internal electrical wire"). Especially, the shape of the wire transport element is such that the wire transport element can be transported through (at least part of) the cable gland over at least part of the cable gland length (L2).

With such cable gland and wire transport element, it is relatively easy to connect an external electrical wire via a connector with an internal electrical wire (internal in a housing). In embodiments, it is for instance not necessary to open the housing, but one may easily retrieve (part of) the functional device electrically conductive wire from the housing or gland, by removing the wire transport element from the cable gland, and functionally connect the functional device electrically conductive wire with the external electrical wire (of the electrical cable) via a connector. The internal electrical wire is thus in specific embodiments over part of its length within the cable gland (when the support plug is hosted by the cable gland). After connection with the external electrical wire via a connector, the connector can be transported (e.g. manually, such as by pushing) through the cable gland. The cable comprising the external electrical wire may be fed over at least part of its length into the gland over at least part of the gland length, and with a gland nut, the gland can sealingly be closed (over the electrical cable). In this way, e.g. the housing can be sealingly closed (while having a functional connection between the external electrical cable and the electronic device that may be housed by the housing. The housing comprises the electronic device.

Hence, embodiments of this kit of parts may be used providing a functional connection between an electrical cable, (mainly) external from the housing, and an electrical wire, (mainly) internal in the housing, while in the state wherein these are functionally coupled, the housing may sealingly be closed. Over part of its length, the electrical cable may be hosted by the cable gland in the functionally connected state.

In specific embodiments, the wire transport element comprises an electrical wire-to-wire connector, wherein the wire-to-wire connector comprises an electrical connector facility for an electrically conductive coupling of the electrically conductive wire of the electrical cable and a functional device electrically conductive wire. Especially, the shape of the electrical wire-to-wire connector is such that the electrical wire-to-wire connector can be transported through the cable gland.

Hence, in yet a further aspect the invention provides a kit of parts, wherein a wire-to-wire connector may be applied, to which the functional device electrically conductive wire may be associated. Therefore, in a further aspect the invention provides a kit of parts comprising (i) a cable gland comprising a cable gland body and a sealing nut, wherein the cable gland is configured for hosting an electrical cable over at least part of a cable length (L) of the electrical cable, wherein the electrical cable comprises an electrically conductive wire; and (ii) an electrical wire-to-wire connector ("connector") comprising an electrical connector facility ("connector facility") for an electrically conductive coupling of the electrically conductive wire of the electrical cable and a functional device electrically conductive wire, wherein the shape of the electrical wire-to-wire connector is such that the electrical wire-to-wire connector can be transported through the cable gland.

With such cable gland and connector, it is relatively easy to connect an external electrical wire via the connector with an internal electrical wire (internal in a housing). It is for instance not necessary to open the housing, but one may easily retrieve the connector from the housing or gland and functionally connect with the external electrical wire. It may even be possible that a housing is provided with the connector (connected to the internal electrical wire), configured outside of the housing (and not in the gland), while the internal electrical wire is thus over part of its length within the cable gland. After connection with the external electrical wire, the connector can be transported (e.g. manually, such as by pushing) through the cable gland. The cable comprising the external electrical wire is fed over at least part of its length into the gland over at least part of the gland length, and with a gland nut, the gland can sealingly be closed (over the electrical cable). In this way, e.g. the housing can be sealingly closed.

Hence, embodiments of this kit of parts may be used providing a functional connection between an electrical cable, (mainly) external from the housing, and an electrical wire, (mainly) internal in the housing, while in the state wherein these are functionally coupled, the housing may sealingly be closed. Over part of its length, the electrical cable may be hosted by the cable gland in the functionally connected state.

Hence, the wire transport element may e.g. comprise a gland plug comprising a wire transport connector facility, from which the functional device electrically conductive wire can be detached. The functional device electrically conductive wire can be decoupled from the wire transport element and can be coupled to an external electrical wire via a wire-to-wire connector. In yet other embodiments, the wire transport element may e.g. comprise the wire-to-wire connector, which can detachably be associated to a gland plug. In the latter embodiment, the functional device electrically conductive wire is already functionally coupled to the wire-to-wire connector; the external electrical wire can functionally be coupled to the functional device electrically conductive wire via the wire-to-wire connector.

The term "kit of parts" especially refers to a juxtaposition of separate but functionally interacting individual components (when configured in operation), such as the gland and the transport element, or the gland and the connector. These are especially dimensioned such that the electrical wire-to-wire connector can be transported through (at least part of) the cable gland, or such as the electrical wire-to-wire connector and a support plug (wherein the support plug (can detachable host the electrical wire-to-wire connector) can be transported through (at least part of) the cable gland, or the gland plug comprising the wire transport connector facility can be transported through (at least part of) the cable gland. Different embodiments or aspects of the kits of parts may be indicated as "kit".

As indicated above, in embodiments the invention provides a kit of parts comprising the cable gland and the electrical wire-to-wire connector. Further, the invention provides a kit of parts comprising the cable gland and the transport element in general, such as a wire-to-wire connector. Herein, the invention is amongst others described in relation to the application of the wire-to-wire applicator, but as will be clear to a person skilled in the art most of these embodiments also relate to other embodiments of the transport element, such as the plug comprising one or more connector facilities.

Herein, phrases like "transport through" and similar phrases especially refer to the state wherein the sealing nut is not sealingly closing the cable gland. It especially refers to the situation that transport, sometimes with some force, is possible when the sealing nut is unscrewed from the gland body. When the sealing closure with the sealing nut is provided, the cable, the plug, may be fixed (by the sealing nut), and essentially not transport is possible anymore. Hence, the phrase "dimensions allowing transport through the cable gland" and similar phrases especially indicate that the cross-sectional dimensions are such that transport through the cable gland body is in principle possible, based on the cross-sectional dimensions of the cable gland (especially of a cable gland channel provided by the cable gland body).

Especially, the cable gland comprises a cable gland body and a sealing nut for the cable gland body.

The sealing nut may especially be configured for sealingly closing the cable gland when the electrical cable is hosted by the cable gland over at least part of the cable length (L). The sealing nut may be associated to the gland body by screwing the nut to the gland body. The sealing nut may also be indicated as "pressure dome".

The cable gland body is especially a hollow body, through which a cable can be guided. Especially, the cable gland body and the cable are chosen to provide to the cable a clearance fit, or transition fit, though a friction fit may be possible as well.

The cable gland also includes a sealing nut. Due to the pressure of the sealing nut, a sealing (and friction fit) is provided. Especially, the gland body may include a thread for the nut.

Further, the body may include sealing fingers which may be pressed together when the sealing nut is screwed on the body. Further, the gland body may be provided with a sealing sleeve which may be arranged within the body, such as in physical contact with the pressure fingers. Due to the pressure of the sealing nut on the pressure fingers and optional sealing slave, the sealing (and friction fit) is provided.

Further, the body may comprise an external thread, configured at another end of the body (with the thread, and the optional pressure fingers at a first end of the body). A locknut may be used to screw to the external thread, for arranging the gland body to e.g. a housing. The housing may thus include a through hole through which part of the gland body can be transported, and which may allow a functional association of the cable gland and the housing, for functionally coupling an electronic device inside the housing with a cable mainly external from the housing. For instance, alternatively, see also below, the gland body may be integrated in the housing.

Further, especially the cable gland is configured for hosting an electrical cable over at least part of a cable length (L) of the electrical cable. Especially an end part of the cable may be hosted by the cable gland. In general, the cable gland will host part of the cable, with a (longer) part of the cable part at one side of the cable gland, such as external of the housing, and with a (shorter) part of the cable the other side of the cable gland, such as within the housing. The phrase "at least part of a cable length (L)" refers to the length of the part of the cable that is hosted by the cable gland, especially in the functionally connected state. The cable itself will be longer than the cable gland (body). The cable may be functionally connected to the mains.

The term "electrical cable" especially refers to an assembly of one or more wires running side by side or bundled, which is used to carry electric current. Especially, an electrical cable is an assembly consisting of one or more conductors with their own wire insulations, and optional screens, individual covering(s), assembly protection and protective covering(s). Especially, the electrical cable at least includes one or more electrically conductive wires, each having their own wire insulation, which are configured within a cable jacket (of electrically insulating material). Hence, the electrical cable comprises an electrically conductive wire. The term "electrically conductive wire" may also refer to a plurality of electrically conductive wires (each with their own insulation) configured parallel in the electrical cable. In specific embodiments, the electrical cable comprises two electrically conductive wires, i.e. the phase and neutral. In other specific embodiments, the electrical cable comprises three electrically conductive wires, i.e. the phase and neutral and ground. In yet further specific embodiments, the electrical cable comprises in addition to one or more electrically conductive wire also one or more other functional conductors, such as an optical fiber.

Note that electrical cable is—in embodiments—essentially not comprised by the kit of parts (comprising the cable gland and the wire-to-wire connector, or comprising the cable gland and the transport element), as well as the accompanying claims thereto, or the system, as well as the accompanying claims thereto. However, in specific embodiments, in addition to the cable gland and the wire-to-wire, or in addition to the cable gland and the transport element, the kit of parts (or system) may also include an electrical cable. The electrical cable and cable gland are especially configured for each other, such that the cable gland can sealingly close when the cable is hosted over part of the cable length (in the cable gland).

As indicated above, the kit may in a further aspect comprise an electrical wire-to-wire connector. The wire-to-wire connector may especially be an insulating body with means for connecting two wires, which each lead to a different element, such as on the one hand to the means and on the other hand to an (electronic) device. The former wire is indicated as electrically conductive wire (of the cable) and the latter is indicated as functional device electrically conductive wire, as this wire will in general be functionally coupled to an electronic device (example of functional device).

Especially, the wire-to-wire connector comprises an electrical connector facility for an electrically conductive coupling of the electrically conductive wire of the electrical cable and a functional device electrically conductive wire. Example of wire connectors are e.g. screw terminals (screw terminal blocks). However, other types of terminal blocks or wire-to-wire connectors, e.g. splice connectors, soldering, (resistance) welding, or male-female-receptacle type connectors may also be applied.

The connector facility can be a cavity wherein the part of an electrically conductive wire, especially after stripping a part of the isolation round the electrically conductive wire, can be introduced and fixed. Fixing can be done by using a screw, soldering, (resistance) welding, or by using a poke-in connector, twister wire connector, etc., as known in the art.

Therefore, in embodiments the connector facility comprises a first power connector opening at a first side of the electrical wire-to-wire connector and a second power connector opening at a second side of the electrical wire-to-wire connector, opposite to the first power connector opening, wherein the first power connector opening is configured to host part of the functional device electrically conductive wire, and wherein the second power connector opening is configured to host part of the electrically conductive wire of the electrical cable. Especially, the electrical wire-to-wire connector comprises a plurality of such connector facilities, such as at least two (such as especially phase and neutral) or at least three (phase and neutral and ground). Hence, in embodiments the electrical wire-to-wire connector comprises 3-8 of such connector facilities.

The elements of the kit of parts (with the wire-to-wire connector) are designed such, that while one or more functional device electrically conductive wires are (functionally) associated to the wire-to-wire connector, the wire-to-wire connector can be transported through the cable gland from one side to the other side (especially when the gland nut is removed). Hence, this allows e.g. pulling the wire-to-wire connector out of a housing (hosting an electrical device to which the functional device electrically conductive wires(s) may be functionally coupled), connecting the electrically conductive wire(s) to the wire-to-wire connector, pushing the wire-to-wire connector back into the housing, such that at least part of the electrical cable that hosts part of the one or more electrically conductive wire(s) is within the cable gland, and the cable gland can, via the sealing nut, sealingly be closed over the electrical cable.

Therefore, in embodiments the shape of the electrical wire-to-wire connector (and the cable gland) is (are) such that the electrical wire-to-wire connector can be transported through the cable gland. More especially, in embodiments the shape of the electrical wire-to-wire connector (and the cable gland) is (are) such that the electrical wire-to-wire connector, with the functional device electrically conductive wire associated to the electrical connector facility, can be transported through the cable gland. Note that a cross-section of the wire-to-wire connector is smaller than a cross-section of the electrical cable (suitable for use with the cable gland).

In yet a further aspect, the kit not only comprises the cable gland and the wire-to-wire connector, but may also comprise a plug, which may also be indicated as "gland plug" or "support plug".

The term "support plug" is used amongst others to indicate that this plug can be used to especially support the wire-to-wire connector (when not yet attached to an external cable). Especially, the wire-to-wire connector is detachably supported by the plug, as after the plug with wire-to-wire connector is removed from the cable gland, the connections have been created, the wire-to-wire connector can be transported back through the cable gland (but without the plug, as now the wire-to-wire connector is functionally coupled to the cable).

Therefore, the invention also provides a kit of part as amongst others defined above, further comprising (iii) a support plug, wherein the sealing nut is further configured for sealingly closing the cable gland when the support plug is hosted by the cable gland over at least part of a support plug length (L1) of the support plug, wherein the support plug—in embodiments—further comprises an electrical power connector receptor for detachably hosting the electrical wire-to-wire connector.

One may also state that the sealing nut and the support plug are further configured for sealingly closing the cable gland when the support plug is hosted by the cable gland over at least part of a support plug length (L1) of the support plug.

Therefore, especially the shape of the electrical wire-to-wire connector and the cable gland and the support plug is (chosen) such that the electrical wire-to-wire connector (with the functional device electrically conductive wire associated to the electrical connector facility) (and hosted by the electrical power connector receptor) can be transported through the cable gland, by transporting at least part of the support plug through at least part of the cable gland. In this way, the wire-to-wire connector is retrieved from the cable gland, or associated housing, and can functionally be coupled to the cable.

As indicated above, the electrical power connector receptor is configured to detachably host the electrical wire-to-wire connector. Especially, the electrical power connector receptor is configured to detachably host the electrical wire-to-wire connector via an interference fit.

Alternatively, the electrical power connector receptor is configured to detachably host the electrical wire-to-wire connector via a snap fit (see also above and below).

It appears to facilitate e.g. handling of the wire-to-wire connector associated to the functional device electrically conductive wire, such as transporting to the cable gland, when the plug has a length equal to or larger than the length of the cable gland, especially larger. This may also facilitate associating the functional device electrically conductive wire to the plug.

Hence, in embodiments the cable gland has a cable gland length (L2), wherein the support plug length (L1) is at least equal to the cable gland length (L2). Further, especially the support plug may comprise a grip element at a first end of the support plug; the electrical power connector receptor is configured at a second end of the support plug. The grip element may include ridges and/or other roughening of the surface at the end.

As indicated above, the gland plug may, however, also be used for a detachable (direct) association with the functional device electrically conductive wire(s). To this end, the wire-to-wire connector is not detachable supported by the plug, but the plug itself comprises one or more connector facilities for detachable associating one or more functional device electrically conductive wires. Such plug may optionally also be indicated as "support plug". Such connector facilities may in embodiments be through holes in the plug. In such through hole, the functional device electrically conductive wire can e.g. be hooked. Other temporary associations between a functional device electrically conductive wire and the connector facility may also be possible.

As indicated above, in yet a further embodiment, the wire transport element may comprise a support plug, wherein the support plug comprise the wire transport connector facility for detachably hosting a part of a functional device electrically conductive wire. In specific embodiments, the support plug comprises a plurality of wire transport connector facilities. Hence, especially, in these embodiments the gland plug may comprises a plurality of such connector facilities, such as at least two, or at least three. Hence, in embodiments the electrical wire-to-wire connector comprises 3-8 of such connector facilities.

Therefore, especially the shape of the cable gland and the support plug (and the wire transport connector facility or facilities) is (are) (chosen) such that the support plug (with the functional device electrically conductive wire associated to the wire transport facility) can be transported through the cable gland, by transporting at least part of the support plug through at least part of the cable gland. In this way, the part of the functional device electrically conductive wire is retrieved from the cable gland, or associated housing, and can functionally be coupled to the cable (via a wire-to-wire connector).

As indicated above, the invention provides in embodiments a kit of parts comprising the cable gland and the wire-to-wire connector, and optionally the plug. Further, as can be derived from the above, the invention provides in embodiments also a kit of parts comprising the cable gland and the plug, wherein the plug especially comprises the wire transport connector facility or facilities, and optionally a wire-to-wire connector.

In yet a further aspect, the invention also provides a kit of parts comprising the support plug and the wire-to-wire connector. Therefore, the invention thus also provides in an aspect a kit of parts comprising: (i) an electrical wire-to-wire connector (such as defined above); and (ii) a support plug (such as defined above) for sealingly closing a cable gland (such as defined above), wherein the support plug comprises an electrical power connector receptor for detachable hosting the electrical wire-to-wire connector. The wire-to-wire connector and support plug may especially be designed such that the wire-to-wire connector can be supported by the support plug. Further, such kit of parts may especially be designed for a specific cable gland. Hence, such kit of parts may also comprise a cable gland, see also above.

Hence, embodiments of this kit of parts may be used providing a functional connection between an electrical cable, (mainly) external from a housing to which a cable gland may be functionally coupled (and to which the wire-to-wire connector and the support plug may be designed), and an electrical wire, (mainly) internal in the housing, while in the state wherein these are functionally coupled, the housing may sealingly be closed. Over part of its length, the electrical cable may be hosted by the cable gland in the functionally connected state. The housing may also sealingly be closed when there is no functional connection between an electrical cable, (mainly) external from a housing to which a cable gland may be functionally coupled, and an electrical wire, (mainly) internal in the housing, but when the cable gland hosts the gland plug (with the wire-to-wire connector).

Note that electrical cable is essentially not comprised by the kit(s) of parts comprising the support plug and the wire-to-wire connector as well as the accompanying claims thereto. However, in specific embodiments, in addition to the support plug and the wire-to-wire connector, the kit(s) of parts may also include an electrical cable. The support plug and cable gland are especially configured to be used for the same cable gland, which can sealingly close when the cable of or the support plug are (respectively) hosted over part of the cable length or support plug length.

As indicated above, the cable gland may in applications be associated to e.g. a device or a housing of a device. Therefore, the kit of parts comprising the cable gland and the wire-to-wire connector, and optionally the plug, or the kit of parts comprising the electrical wire-to-wire connector and the support plug, and optionally, the cable gland, or the kit of parts comprising the support plug and the wire-to-wire connector, and optionally the cable gland, may (each independently) further comprise a device, or a housing of a device, wherein the device especially comprises a light generating device. The device may functionally be coupled to the wire-to-wire connector.

Hence, in embodiments of the kits, the kit may further comprise (iii) a housing, wherein the housing is configured to host an electronic device, and wherein (in specific embodiments) the functional device electrically conductive wire is functionally coupled to the electronic device. In further specific embodiments, the electronic device especially comprises a light generating device. The light generation device may comprise one or more light sources (see also below).

As (also) indicated above, the cable gland may in applications be associated to e.g. a device or a housing of a device. Especially, at least part of the cable gland may in embodiments be integrated in the housing.

The above described kits of parts may be used for assembling a lighting-system, such as herein described.

In yet a further aspect, the invention also provides a system comprising a housing, wherein the housing hosts at least part of a functional device electrically conductive wire, wherein the system further comprises the cable gland and the wire transport element, such as defined herein, wherein the cable gland body is functionally coupled to the housing, wherein a wire part (or end part) of the functional device electrically conductive wire is hosted by the wire transport element, wherein a wire length of the functional device electrically conductive wire and an arrangement of the functional device electrically conductive wire are chosen to allow transport of the wire transport element through the cable gland over at least part of the cable gland length (L2). In specific embodiments, the housing hosts an electronic device, wherein the functional device electrically conductive wire is functionally coupled to the electronic device. Hence, in embodiments the elements of embodiments of the kits of parts may be functionally integrated in the system.

The wire transport element may be hosted by the cable gland over a part of its length once it is installed in the system.

Hence, in a yet a further aspect the invention also provides a system comprising a housing, wherein the housing hosts at least part of a functional device electrically conductive wire, wherein the system further comprises the cable gland and the electrical wire-to-wire connector as defined herein, wherein the cable gland body is functionally coupled to the housing, wherein a wire part (especially an end part) of the functional device electrically conductive wire is associated to the electrical connector facility of the electrical wire-to-wire connector. Especially, a wire length of the functional device electrically conductive wire and an arrangement of the functional device electrically conductive wire are chosen to allow transport of electrical connector facility from internal of the housing through the cable gland to the external of the housing. The arrangement of the functional device electrically conductive wire is especially at least partly in the housing. For instance, the functional device electrically conductive wire may be functionally coupled to an electronic device, such as a light generating device, configured within the housing. The functional device electrically conductive wire may thus be functionally coupled at one end to the electronic device, and may not fully be removed from the housing (without first decoupling from the device). However, its length may be such and the functional device electrically conductive wire may be bendable or flexible, such that part of the functional device electrically conductive wire may be retrieved from the housing by pulling the plug with the wire-to-wire connector coupled to the functional device electrically conductive wire out of the cable gland. Thereby, part of the functional device electrically conductive wire is retrieved from the housing and can be coupled via the wire-to-wire connector to an electrically conductive wire from the cable.

Hence, in embodiments the housing hosts an electronic device, wherein the functional device electrically conductive wire is functionally coupled to the electronic device. In embodiments, the housing may thus be a waterproof housing. The housing may be a housing according to the International Protection Marking IP65 (or higher). The housing may be configured for preventing ingress of dust and water.

The housing may essentially be fully closed, and in embodiments the only inlet may e.g. be the cable gland(s).

As will be clear to a person skilled in the art, in embodiments the housing may host at least parts of a plurality of functional device electrically conductive wires, such as two or three, or more. In embodiments, these may all be associated to the wire transport connector facilities, such as the electrical connector facilities of a wire-to-wire connector. In general, there will be a single wire-to-wire connector, if any, for a single electronic device. However, systems or kits with a plurality of cable glands and/or a plurality of wire-to-wire connectors and/or a plurality of wire transport elements and/or a plurality of gland plugs, etc., are also within the scope of the claimed invention.

In specific embodiments, the wire transport element comprises an electrical wire-to-wire connector and the wire-to-wire connector comprises an electrical connector facility for an electrically conductive coupling of the electrically conductive wire of the electrical cable and a functional device electrically conductive wire as described herein.

In further specific embodiments, the wire transport element comprises a support plug, wherein the support plug comprise the wire transport connector facility for detachably hosting a part of a functional device electrically conductive wire as described herein.

As indicated above, the electronic device may be a light generating device. Therefore, in embodiments the system is a lighting system and wherein the electronic device comprises a light generating device configured to generate visible lighting device light.

The light generating device may comprise a light source. The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of light sources, such as 2-2000 solid state light sources.

The lighting system may especially be configured to provide visible light, such as white light. The terms "visible", "visible light" or "visible emission" refer to light having a wavelength in the range of about 380-780 nm. The white light may have a luminous flux of at least 300 lm, more preferably at least 500 lm, most preferably 700 lm. The white light has preferably a color temperature in the range from 2.000 K to 10.000 K, more preferably in the range from 2.100 K to 5.000 K, most preferably in the range from 2.200 K to 4.000 K such as for example 2.700 K or 3.000 K.

The cable gland body may e.g. be a polymeric body. The cable gland body can be attached to the housing. In specific embodiments, however, the cable gland body may be integrated in the housing. This may for instance be the case when part of the housing, including the cable gland body, is 3D printed, die casted, molded, etc. In such embodiments, at least part of the housing, and the cable gland body, may be of the same material.

In specific embodiments (of the system) as described herein, the wire transport element has a wire transport element length (L3), and the wire transport element is hosted by the cable gland over at least part of the wire transport element length (L3).

When not installed, the system may be provided with the support plug being hosted by the cable gland. Therefore, in embodiments the cable gland may comprise the sealing nut and the support plug as defined herein, wherein the support plug is hosted by the cable gland over at least part of the support plug length (L1) of the support plug. The support plug may in embodiments host the wire to wire connector. In yet other embodiments, the support plug may include one or more wire transport connector facilities.

The system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, or LCD backlighting.

As indicated above, the invention provides in yet a further aspect also a method for functionally connecting the system as defined herein, with an electrical cable.

Hence, in an aspect the invention provides a method for functionally connecting the system, such as defined herein, with an electrical cable, the method comprising:

removing the wire transport element from the cable gland;

functionally coupling the functional device electrically conductive wire (optionally after decoupling from a wire transport connector facility) and the electrically conductive wire of the electrical cable via a wire-to-wire connector, wherein the shape of the electrical wire-to-wire connector is such that the electrical wire-to-wire connector can be transported through the cable gland, (transporting the wire-to-wire connector back into the cable gland, or even into the housing,) and providing the sealing nut over the electrical cable; and sealingly closing the cable gland with the sealing nut.

Especially, the functional device electrically conductive wire is already associated to the wire-to-wire connector, and after removal of the gland plug from the cable gland, the wire-to-wire connector can be detached from the cable gland, the functional coupling with the electrically conductive wire of the electrical cable can be provided, and the wire-to-wire connector can be introduced into the cable gland, or in general even further into the housing. In this way, the cable gland can host part of the electrical cable.

In a further aspect, the invention provides a method for functionally connecting the system as defined herein, with an electrical cable, the method comprising: (i) removing the support plug from the cable gland; (ii) detaching the wire-to-wire connector from the support plug, functionally coupling the electrically conductive wire of the electrical cable to the wire-to-wire connector, (transporting the wire-to-wire connector back into the cable gland, or even into the housing,) and providing a sealing nut suitable for sealingly closing the cable gland over the electrical cable; and (iii) sealingly closing the cable gland with the sealing nut.

Also in such embodiments the shape of the electrical wire-to-wire connector is such that the electrical wire-to-wire connector can be transported through the cable gland, as the electrical wire-to-wire connector may be transported through the cable gland into the housing.

Such method may be executed manually, or with a robot. Or in embodiments one or more stage of the method are executed manually, and one or more stage of the method are executed with a robot.

More in general, the invention provides amongst others a kit of parts comprising: (i) a cable gland comprising a cable gland body and a sealing nut for the cable gland body, wherein the cable gland is configured for hosting a conveying means for an electromagnetic wave, an electronic signal, or an acoustic signal, such as e.g. an electrical cable or an optical fiber, over at least part of a length (L) of the conveying means, wherein the conveying means comprises a conveying element, such as an electrically conductive wire, like a copper wire, or a glass fiber; (ii) a connector, such as an electrical wire-to-wire connector, or an optical fiber coupler, for a functional coupling of the conveying element of the conveying means and a functional device a conveying element (of a functional device), wherein the shape of the connector (and the cable gland) is (are) such that the connector can be transported through the cable gland. Essentially all embodiments herein, are described in relation to an electrical application. However, all such embodiments may be applied as well for a conveying means (comprising a conveying element for conveying e.g. an electromagnetic wave or an acoustic signal).

In yet further embodiment, the invention provides a sensor with a sensor plug, through which can be sensed (with a sensor), wherein the sensor plug is configured to be hosted over at least part of the sensor plug, by a cable gland. Such cable gland may be comprised by an apparatus. By introducing the sensor plug in the cable gland, the sensor in the sensor plug may sense at least part of the internal of the apparatus.

Hence, amongst others the invention provides a kit of parts, especially for a lighting system with a light generated device hosted in a housing, the kit of parts comprising (i) a cable gland comprising a cable gland body and a sealing nut for the cable gland body, wherein the cable gland is configured for hosting an electrical cable over at least part of a cable length (L) of the electrical cable, wherein the electrical cable comprises an electrically conductive wire, wherein the cable gland has a cable gland length (L2), and (ii) a wire transport element comprising a wire transport connector facility for hosting a part of a functional device electrically conductive wire, wherein the shape of the wire transport element is such that the wire transport element can be transported through the cable gland over at least part of the cable gland length (L2).

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
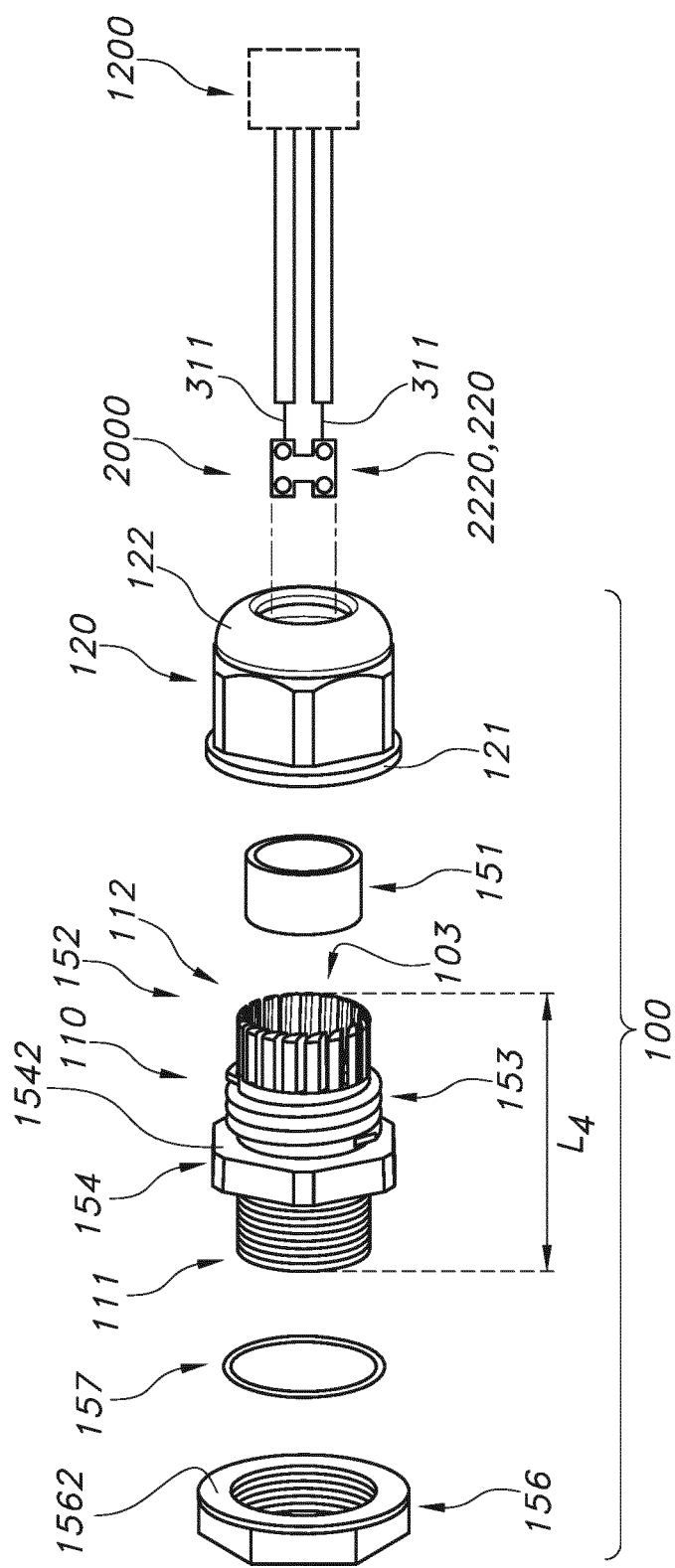
FIGS. 1a-1d schematically depict some aspects of the invention.
Figure 1B:
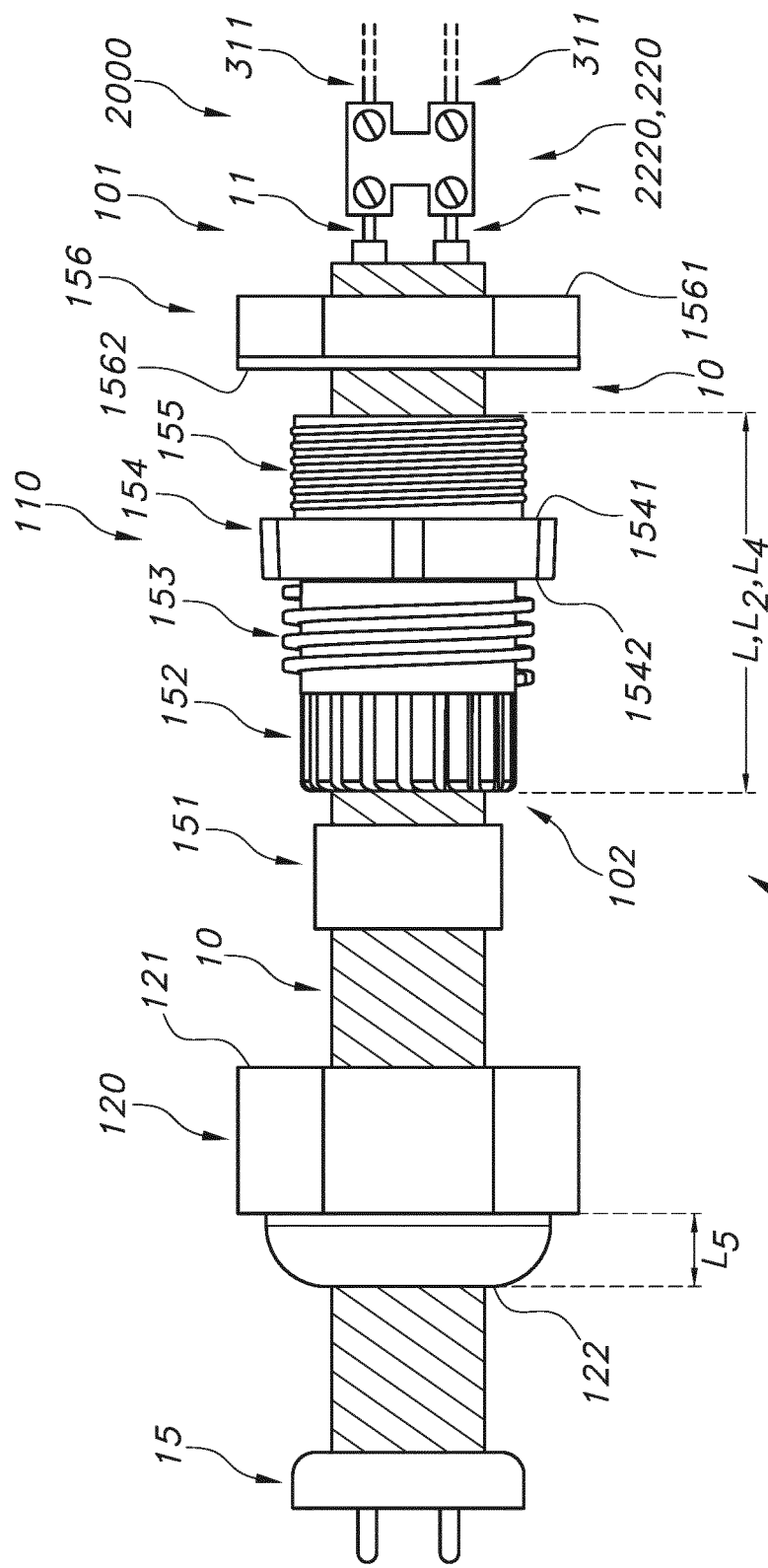

FIGS. 1a-1b schematically depict the cable gland, some optional elements thereof, as well as some aspects in relation to the connector.

FIGS. 1a and 1b schematically depict a wire transport element 2000 comprising a wire transport connector facility 2220 for hosting a part of a functional device electrically conductive wire 311, wherein the shape of the wire transport element 2000 is such that the wire transport element 2000 can be transported through the cable gland 100 over at least part of the cable gland length L2.

FIGS. 1a and 1b schematically depict an embodiment of a cable gland 100 comprising a cable gland body 110 and a sealing nut 120 for the cable gland body 110. The cable gland 100 is configured for hosting an electrical cable 10, as shown in FIG. 1b, over at least part of a cable length L of the electrical cable 10. The electrical cable 10 comprises an electrically conductive wire 11. Here, by way of example two electrically conductive wires 11 are schematically depicted in FIG. 1b. The sealing nut 120 can be used for sealingly closing the cable gland 100 when the electrical cable 10 is hosted by the cable gland 100 over at least part of the cable length L.

The cable gland 1 here comprises in addition to the cable gland body and sealing nut 120, a sealing 151 which fits over the cable 10, and which fits within the cable gland body 110. The sealing 151 may also be indicated as sealing sleeve. Further, the cable gland 100 may comprise a lock nut 156; the lock nut may be used to fix the cable gland to a body (wall) (of e.g. a housing, see also below). A (thin) sealing 157 may be used for sealing the cable gland with the lock nut 156.

The cable gland body especially comprises a thread 153, such as a multiple trapezoidal thread for securing, to which the sealing nut may be screwed. The sealing nut may cover a lamellar part of the body 110, at a second end thereof. This lamellar part provides pressure fingers, which will be pressed against the cable (with the sealing sleeve 151 configured intermediate of the cable and the lamellar part). The lamellar part is for optimum strain relief and protection for the cable. This lamellar part is indicated with reference 152.

When the cable gland body 110 is not to be configured integrated in a housing, the cable gland body 110 may comprise a second thread 155, at a second end 102 of the cable gland, and a lock nut 156. Element 154 is a stop body. Between the stop body and the lock nut 156 part of a wall may be locked (not shown).

The cable gland 100, or more precisely the cable gland body 110, has a length L2. Over this length (and some length of the sealing nut 120), the cable 10 may be hosted by the cable gland 100. The cable gland body 110 has a cable gland body length L4, which may thus be slightly shorter than the cable gland length L2, as the sealing nut may also provide some length to the cable gland 100. Hence, in principle L2 may be a bit longer in FIG. 1b, such as with about the length indicated with reference L5. Hence, in embodiments L1≈L4+L5. The sealing nut 120 may have a top side 122, which may be curved, and a back side 121. When the sealing nut 120 is screwed onto the gland body 110, the back side 121 may be close to a second side 1542 of the stop body 154; the back side 121 is directed to the second side 1542 of the stop body 154.

When a lock nut 156 is applied, a second side 1562 is directed to the stop body 154, more especially a first side 1541 of the stop body. Reference 1562 indicates a first side of the stop body 154.

Reference 111 indicates a first side of the gland body 110, and reference 112 indicates a second side of the gland body 110.

By way of example, at one side the cable 10 is provided with a plug, indicated with reference 15, for instance for connection to the electrical mains.

FIGS. 1a and 1b also schematically depict an electrical wire-to-wire connector 200 comprising an electrical connector facility 220 (both figures schematically show two of such facilities) for an electrically conductive coupling of the electrically conductive wires 11 of the electrical cable 10 and a functional device electrically conductive wire 311 (of an electronic device 1200. The shape of the electrical wire-to-wire connector 200 (and the cable gland 100) is such that the electrical wire-to-wire connector 200 (with the functional device electrically conductive wire 311 associated to the electrical connector facility 220) can be transported through the cable gland 100. Hence, the largest cross-section of the wire-to-wire connector 200 fits within the cross-section of the channel defined by the cable gland; or the largest cross-section of the wire-to-wire connector 200 fits within the cross-section of a cable for which the cable glad 100 is designed. This is also schematically depicted in FIG. 1d.

Hence, FIGS. 1a and 1b schematically show amongst others embodiments of a kit of parts comprising the cable gland and the wire-to-wire connector 200.

FIG. 1a also schematically depicts a channel 103 (cable gland channel), defined by the cable gland body.

Figure 1C:
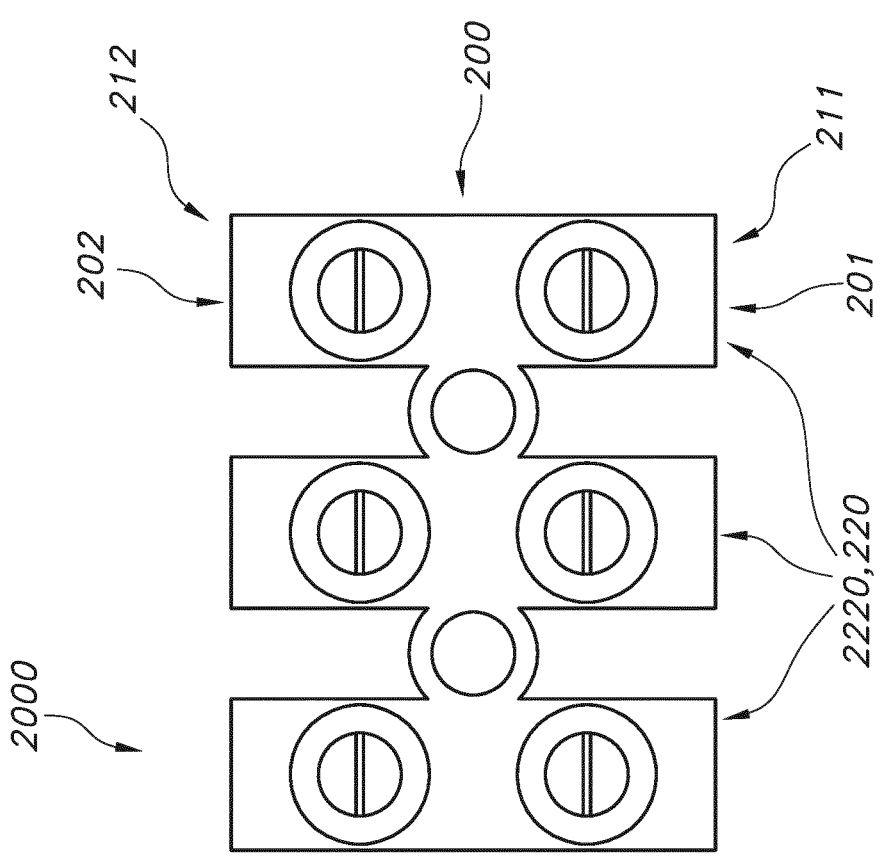

As schematically shown in FIG. 1c, the connector facility 220 may comprise a first power connector opening 201 at a first side 211 of the electrical wire-to-wire connector 200 and a second power connector opening 202 at a second side 212 of the electrical wire-to-wire connector 200, opposite to the first power connector opening 201. The first power connector opening 201 is configured to host part of the functional device electrically conductive wire, and wherein the second power connector opening 202 may be configured to host part of the electrically conductive wire of the electrical cable. Note that FIG. 1c is schematically. In general, the shape and/or dimensions will be smaller to allow transport through the cable gland. Further, the electrical wire-to-wire connector 200 comprises a plurality of such connector facilities 220. In FIGS. 1a-1b two connector facilities 220 are shown, in FIG. 1c three connector facilities 220 are shown. Hence, the electrical wire-to-wire connector 200 may comprise 3-8 of such connector facilities 220.

Figure 1D:
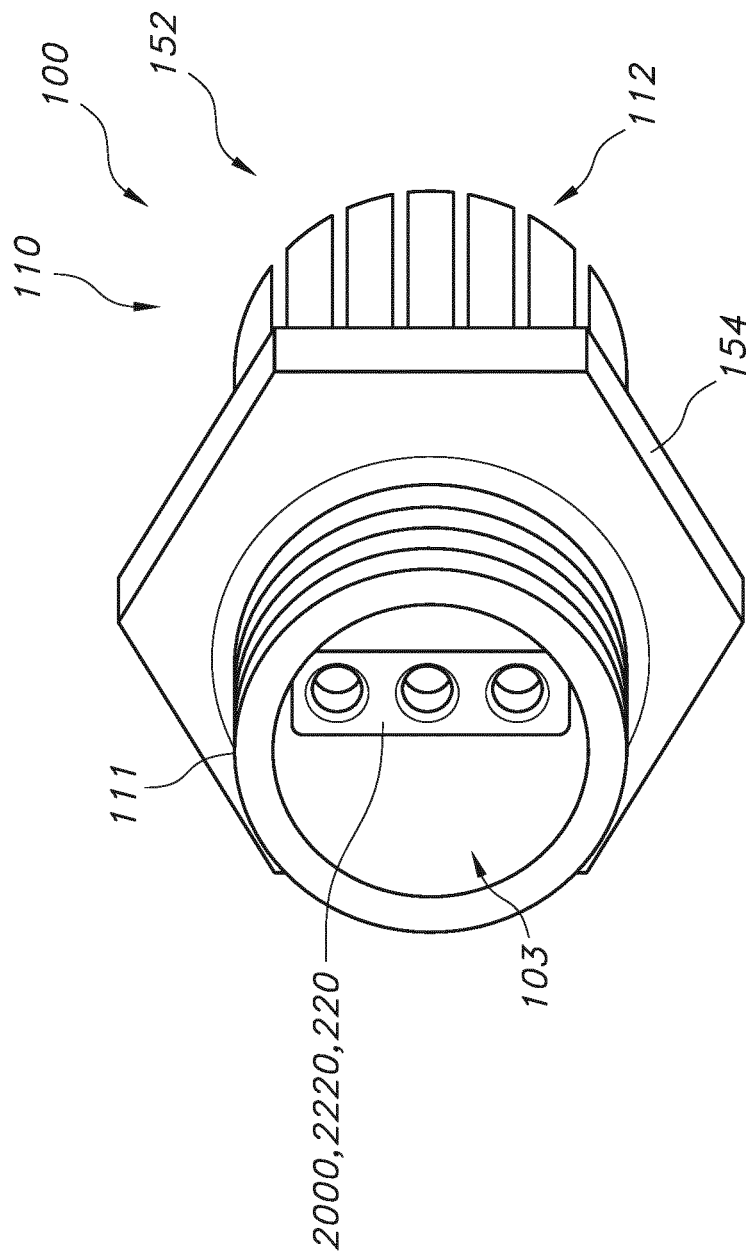

FIG. 1d schematically depicts that the dimensions of the wire-to-wire connector are such that the connector may be introduced into the cable gland 100/cable gland body 110. In general, the introduction via the second side 112 of the gland body 110 into the gland bod 110 may especially be possible when the sealing nut 120 is not screwed onto the gland body. Likewise, the dimensions of at least part of the wire transport element 2000 or the support plug 400 is such, that at least part thereof may be hosted by the cable gland 100 and cable gland body 110. Hence, the cross-sectional dimensions of the plug, connector, transport element, etc., may be such allowing transport in at least part of the cable gland (body).

Figure 2A:
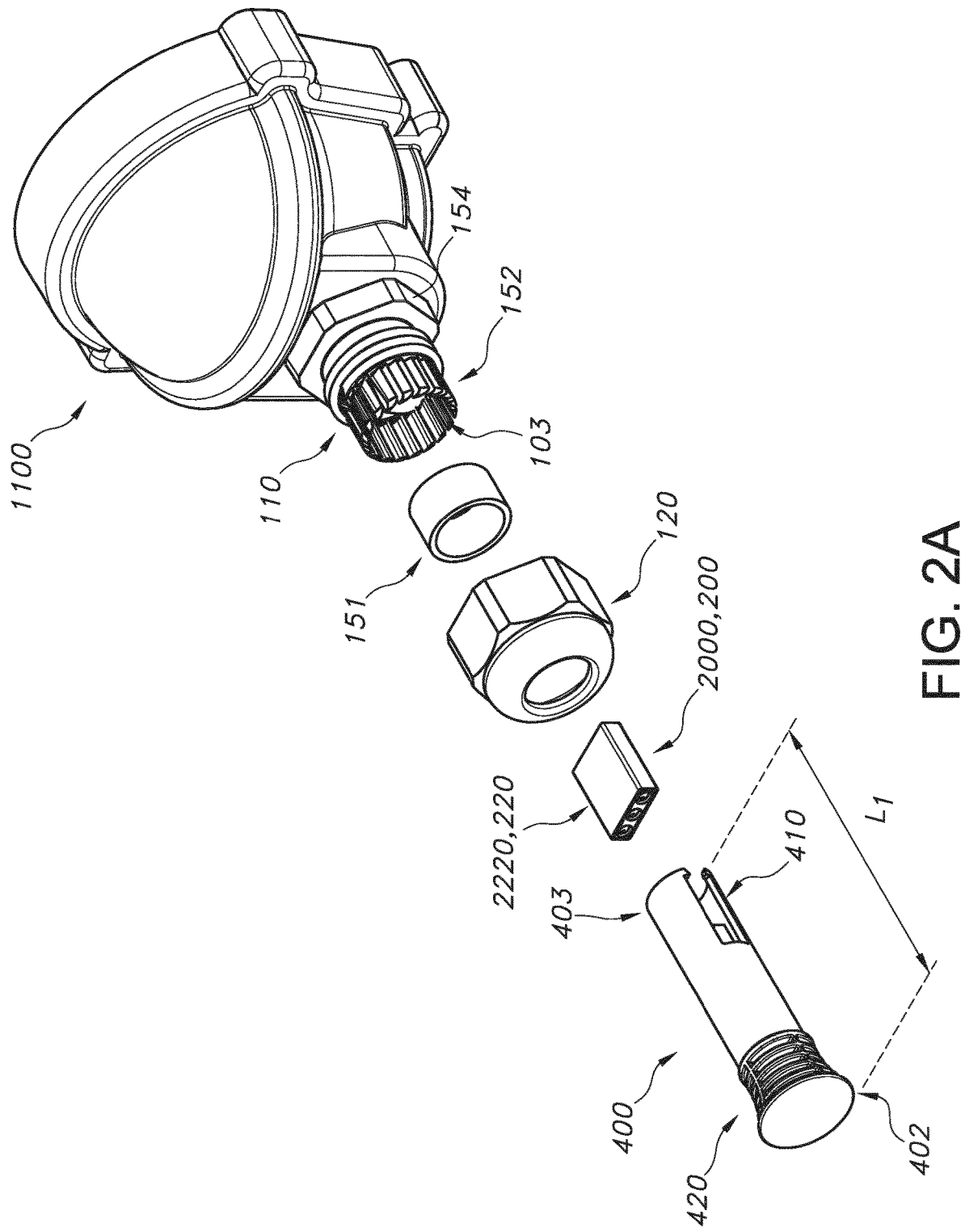
FIGS. 2a-2b schematically depict some further aspects of the invention; note that FIGS. 2a and 2b only show part of the housing, especially an end part.
Figure 2B:
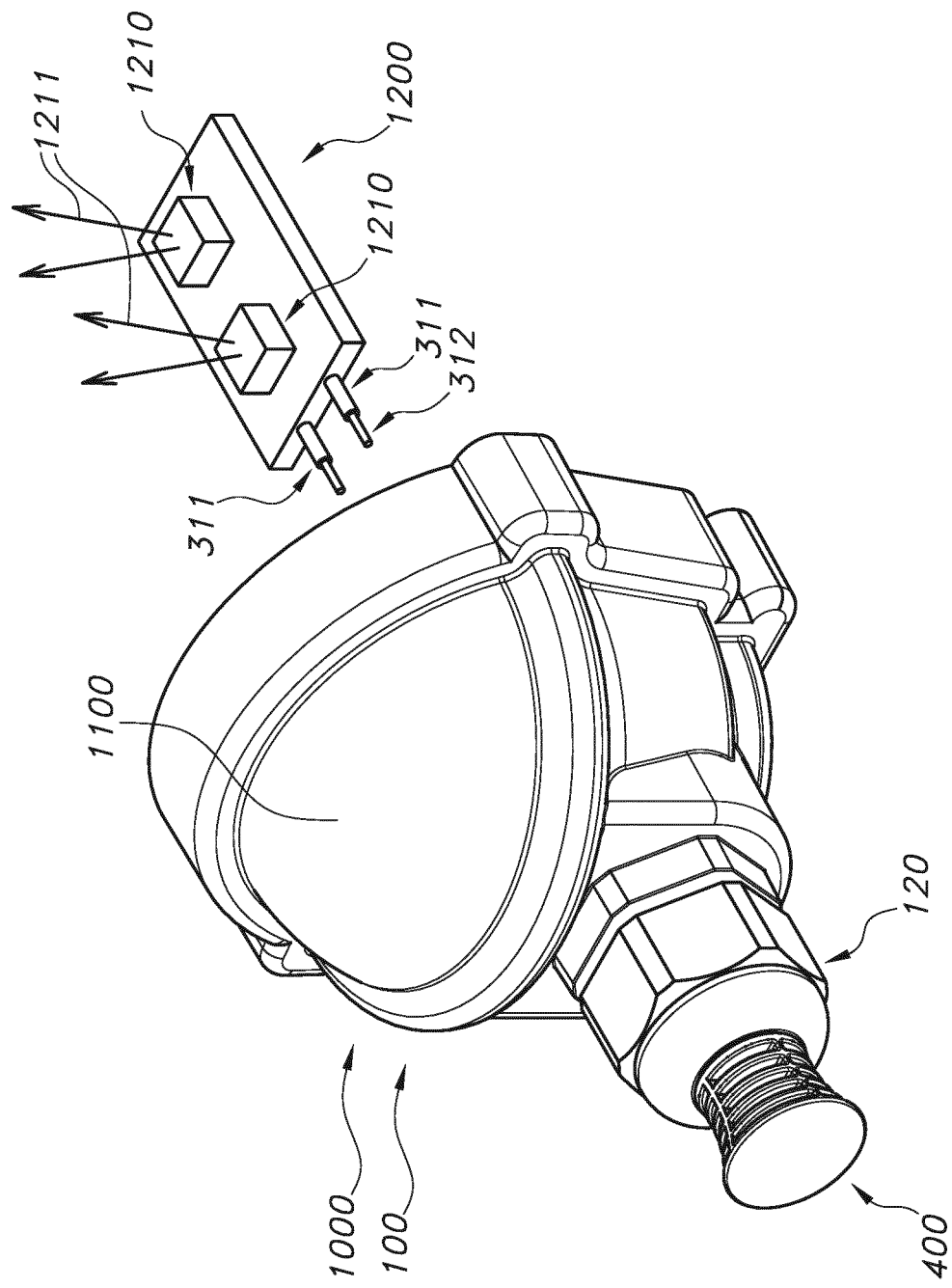

FIGS. 2a-2b very schematically depict a support plug 400 and its use. Hence, the kit of parts may further comprise the support plug 400. Note that these figures only schematically depict and end part of the housing.

Especially, the sealing nut 120 (and the support plug 400) is (are) further configured for sealingly closing the cable gland 100 when the support plug 400 is hosted by the cable gland 100 over at least part of a support plug length L1 of the support plug 400. As schematically shown in FIG. 2a, the support plug 400 further comprises an electrical power connector receptor 410 for detachable hosting the electrical wire-to-wire connector 200. Especially, the electrical power connector receptor 410 is configured to detachably host the electrical wire-to-wire connector 200 via an interference fit.

The shape of the electrical wire-to-wire connector 200 and the cable gland 100 and the support plug 400 are especially such that the electrical wire-to-wire connector 200 with the functional device electrically conductive wire 311 associated to the electrical connector facility 220 and hosted by the electrical power connector receptor 410 can be transported through the cable gland 100, by transporting at least part of the support plug 400 through at least part of the cable gland 100.

As shown in FIG. 1b, the cable gland 100 has a cable gland length L2. The support plug length L1 is at least equal to the cable gland length L2. Further, the support plug 400 comprises in embodiments a grip element 420 at a first end 402 of the support plug 400. The electrical power connector receptor 410 is configured at a second end 403 of the support plug 400.

FIG. 2a thus also schematically depicts a kit of parts comprising an electrical wire-to-wire connector 200 and a support plug 400.

The support plug 400 is especially configured for sealingly closing a cable gland 100. The support plug 400 comprises an electrical power connector receptor 410 for detachable hosting the electrical wire-to-wire connector 200.

FIGS. 2a-2b also schematically depict (part of) a system 1000 comprising a housing 1100. The housing 1100 hosts at least part of a functional device electrically conductive wire 311.

The system 1000 further comprises the cable gland 100 and the electrical wire-to-wire connector 200. The cable gland body 110 is functionally coupled to the housing 1100. In embodiments, the cable gland body 110 is integrated in the housing 1100.

Aa wire part 312 (or end part) of the functional device electrically conductive wire 311 can be associated to the electrical connector facility 220 of the electrical wire-to-wire connector 200. The wire length of the functional device electrically conductive wire 311 and an arrangement of the functional device electrically conductive wire 311 are chosen to allow transport of electrical connector facility 220 from internal of the housing 1100 through the cable gland 100 to the external of the housing 1100.

As shown in FIG. 2b, the housing 1100 hosts an electronic device 1200. The functional device electrically conductive wire 311 is functionally coupled to the electronic device 1200.

FIG. 2b also shows that (functional device) electrically conductive wires are accessible, such as by stripping a part of the isolation.

Further, as shown in FIG. 2b the system 1000 may be a lighting system. Especially, the electronic device 1200 comprises a light generating device 1210 configured to generate visible lighting device light 1211.

FIG. 2b shows the configuration wherein the cable gland 100 comprises the sealing nut 120 and the support plug 400, and wherein the support plug 400 is hosted by the cable gland 100 over at least part of the support plug length of the support plug 400.

As is clear from the drawings, functionally connecting the system 1000 with an electrical cable 10, may include (i) removing the support plug 400 from the cable gland 100, (ii) detaching the wire-to-wire connector 200 from the support plug 400, functionally coupling the electrically conductive wire 11 of the electrical cable 10 to the wire-to-wire connector 200, and providing a sealing nut 120 suitable for sealingly closing the cable gland 100 over the electrical cable 10; and sealingly closing the cable gland 100 with the sealing nut 120.

In embodiments, the support plug may comprise a sensor. In such embodiments, the support plug may not include the wire-to-wire connector 200. For such embodiments, a sensing of the internal of a housing may be realized, while maintaining a good closing of the housing, such as for preventing ingress of water and/or dust.

As indicated above, instead of electrical cables, also other type of cables may be used. This may also imply that the connector is configured to facilitate transport of the material or waves etc. to be transported through the cable gland.

Figure 3:
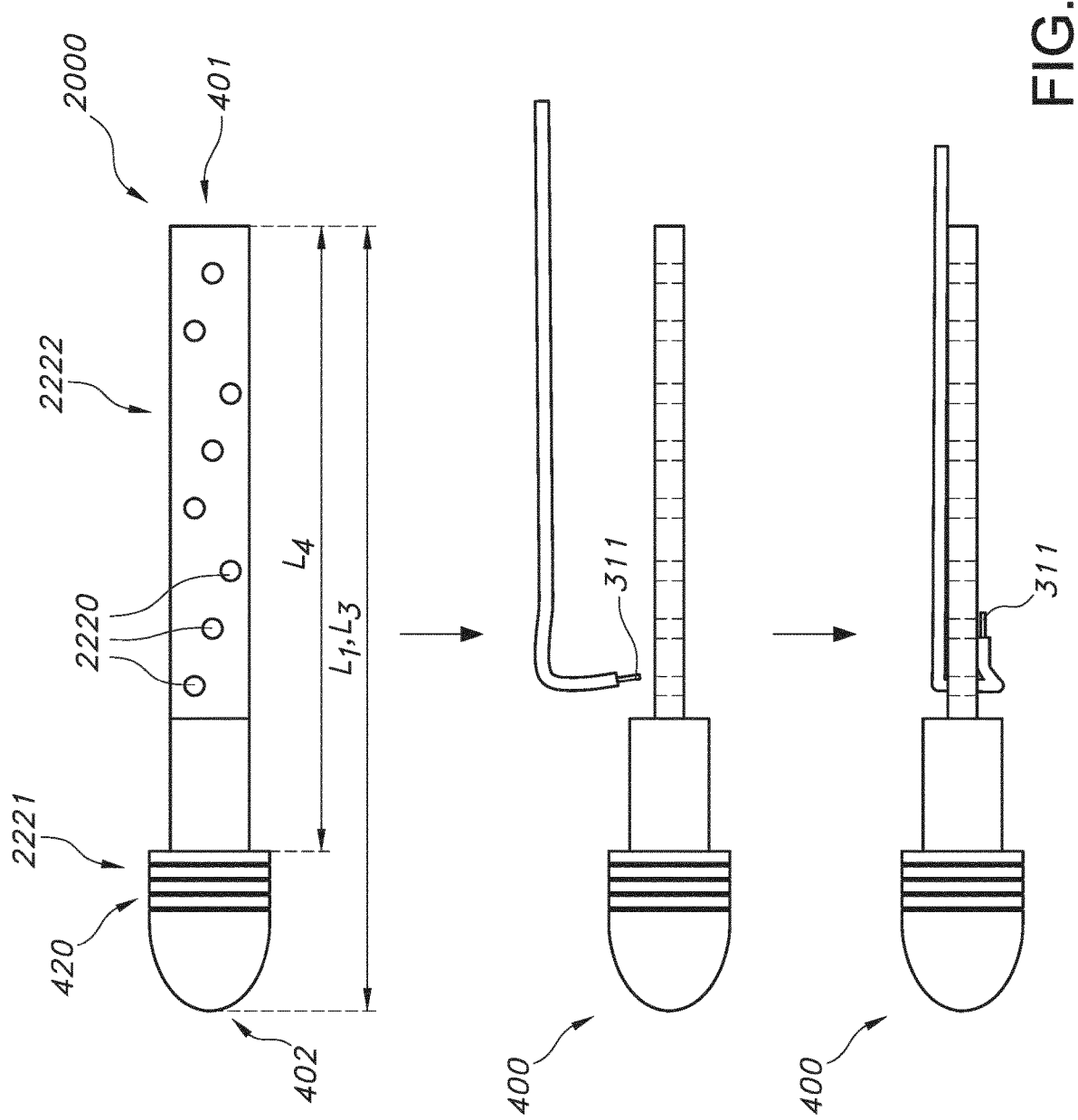
FIG. 3 schematically depict a further aspect of the invention.

FIG. 3 schematically depicts an embodiment of the wire transport element 2000 comprising a wire transport connector facility 2220 for hosting a part of a functional device electrically conductive wire 311. Here, the wire transport connector facility 2220 is integrated in the body of a support plug 400. Hence, in this embodiment the wire transport element 2000 comprises a support plug 400, wherein the support plug 400 comprise the wire transport connector facility 2220 for detachably hosting a part of a functional device electrically conductive wire 311. This detachably hosting is show in FIG. 3 by inserting the functional device electrically conductive wire 311 through a hole as facility 2220, and bending part of it for fixation. The top figure is a top view, the two subsequent figures are side views. The shape of the wire transport element 2000 is such that the wire transport element 2000 can be transported through the cable gland 100 over at least part of the cable gland length L2. As shown in FIG. 3, the support plug 400 comprises a plurality of wire transport connector facilities 2220, here by way of example 8. This implies that 1-8 functional device electrically conductive wire 311 can detachably be coupled to the plug 400.

The wire transport element 2000 has a wire transport element length L3. The wire transport element 2000 may be hosted by the cable gland 100, see e.g. also FIG. 2*b* (though this FIG. 2*b* is especially used in relation to the embodiment schematically depicted in FIG. 2*a*) over at least part of the wire transport element length L3. The part that may be inserted in the cable gland has a length L4. In general, L4<L3, for instance because of the presence of a grip element 420 (at second end 402) of the wire transport element 2000, here in the form of a plug 400.

In FIG. 2*b*, the wire transport element 2000 includes a second part 2222 which may have cross-sectional dimensions smaller than a first part 2221. The first part 2221 may sealingly close together with the sealing nut, the cable gland (see e.g. FIG. 2*b*). The second part may comprise the one or more transport connector facilities 2220.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A kit of parts comprising:
   (i) a cable gland comprising a cable gland body and a sealing nut for the cable gland body, wherein the cable gland is configured for hosting an electrical cable over at least part of a cable length of the electrical cable, wherein the electrical cable comprises an electrically conductive wire, wherein the cable gland has a cable gland length;
   (ii) a wire transport element comprising a wire transport connector facility for hosting a part of a functional device electrically conductive wire, wherein the shape of the wire transport element is such that the wire transport element can be transported through the cable gland over at least part of the cable gland length; and
   (iii) a housing, wherein the housing comprises an electronic device, wherein the electronic device comprises a light generating device, and wherein the functional device electrically conductive wire is functionally coupled to the electronic device, and characterized in that one of the following applies:
   (A) wherein the wire transport element comprises an electrical wire-to-wire connector, wherein the wire-to-wire connector comprises an electrical connector facility for an electrically conductive coupling of the electrically conductive wire of the electrical cable and the functional device electrically conductive wire wherein the shape of the electrical wire-to-wire connector is such that the electrical wire-to-wire connector can be transported through the cable gland, the kit of parts further comprising a support plug, wherein the sealing nut is further configured for sealingly closing the cable gland when the support plug is hosted by the cable gland over at least part of a support plug length of the support plug, wherein the support plug further comprises an electrical power connector receptor for detachable hosting the electrical wire-to-wire connector; or
   (B) wherein the wire transport element comprises a support plug, wherein the support plug comprise the wire transport connector facility for detachably hosting a part of a functional device electrically conductive wire, wherein the sealing nut is further configured for sealingly closing the cable gland when the support plug is hosted by the cable gland over at least part of a support plug length of the support plug.

2. The kit according to claim 1 wherein, is being applied, wherein the connector facility comprises a first power connector opening at a first side of the electrical wire-to-wire connector and a second power connector opening at a second side of the electrical wire-to-wire connector, opposite to the first power connector opening, wherein the first power connector opening is configured to host part of the functional device electrically conductive wire, and wherein the second power connector opening is configured to host part of the electrically conductive wire of the electrical cable, and wherein the electrical wire-to-wire connector comprises a plurality of such connector facilities.

3. The kit according to claim 2, wherein the electrical wire-to-wire connector comprises 3-8 of such connector facilities.

4. The kit according to claim 1 wherein, is being applied, wherein the electrical power connector receptor is configured to detachably host the electrical wire-to-wire connector via an interference fit or via a snap fit.

5. The kit according to claim 1, wherein, is being applied, wherein the support plug length is at least equal to the cable gland length, and wherein the support plug comprises a grip element at a first end of the support plug, and wherein the electrical power connector receptor is configured at a second end of the support plug.

6. The kit according to claim 1 where, is being applied, wherein the support plug comprises a plurality of wire transport connector facilities.

7. A system wherein the system comprises all the features of the kit of parts as defined in claim 1, wherein the housing hosts at least part of a functional device electrically conductive wire, where the cable gland body is functionally coupled to the housing, wherein a wire part of the functional device electrically conductive wire is hosted by the wire transport element, wherein a wire length of the functional device electrically conductive wire and an arrangement of the functional device electrically conductive wire are chosen to allow transport of the wire transport element through the cable gland over at least part of the cable gland length, wherein the housing hosts an electronic device, wherein the functional device electrically conductive wire is functionally coupled to the electronic device, wherein the system is a lighting system, and wherein the electronic device comprises a light generating device configured to generate visible lighting device light.

8. The system according to claim 7, wherein the wire transport element comprises an electrical wire-to-wire connector and wherein the wire-to-wire connector comprises an electrical connector facility for an electrically conductive coupling of the electrically conductive wire of the electrical cable and a functional device electrically conductive wire.

9. The system according to claim 7, wherein the wire transport element comprises a support plug, wherein the support plug comprise the wire transport connector facility for detachably hosting a part of a functional device electrically conductive wire.

10. The system according to claim 7, wherein the cable gland body is integrated in the housing.

11. The system according to claim 7, wherein the wire transport element has a wire transport element length, and wherein the wire transport element is hosted by the cable gland over at least part of the wire transport element length.

12. A method for functionally connecting the system according to the preceding claim 10 with an electrical cable, the method comprising:
   removing the wire transport element from the cable gland;
   functionally coupling the functional device electrically conductive wire and the electrically conductive of the electrical cable via a wire-to-wire connector, wherein the shape of the electrical wire-to-wire connector is such that the electrical wire-to-wire connector can be transported through the cable gland, and providing the sealing nut over the electrical cable; and
   sealingly closing the cable gland with the sealing nut.

* * * * *